United States Patent
Filimonova et al.

(10) Patent No.: US 8,295,590 B2
(45) Date of Patent: Oct. 23, 2012

(54) METHOD AND SYSTEM FOR CREATING A FORM TEMPLATE FOR A FORM

(75) Inventors: Irina Filimonova, Moscow (RU); Sergey Zlobin, Moskovskaya (RU)

(73) Assignee: ABBYY Software Ltd., Nicosia (CY)

( * ) Notice: Subject to any disclaimer, the term of this patent is extended or adjusted under 35 U.S.C. 154(b) by 1092 days.

(21) Appl. No.: 12/199,226

(22) Filed: Aug. 27, 2008

(65) Prior Publication Data

US 2009/0074303 A1    Mar. 19, 2009

Related U.S. Application Data

(60) Provisional application No. 60/972,712, filed on Sep. 14, 2007.

(51) Int. Cl.
*G06K 9/62*    (2006.01)
(52) U.S. Cl. ........................................................ 382/155
(58) Field of Classification Search ........................ None
See application file for complete search history.

(56) References Cited

U.S. PATENT DOCUMENTS

| | | | |
|---|---|---|---|
| 5,317,646 A | 5/1994 | Sang et al. | |
| 5,555,101 A | 9/1996 | Larson et al. | |
| 5,822,454 A | 10/1998 | Rangarajan | |
| 7,171,615 B2 | 1/2007 | Jensen et al. | |
| 7,764,830 B1 * | 7/2010 | Wnek | 382/159 |
| 2006/0007189 A1 * | 1/2006 | Gaines et al. | 345/179 |

* cited by examiner

*Primary Examiner* — Claire X Wang
(74) *Attorney, Agent, or Firm* — John C. Meline; LeighAnn Weiland

(57) ABSTRACT

A method and system for creating a form template for a form are disclosed. The method comprises analyzing an image of a form to detect object demarcations in the form. The method also comprises classifying the object demarcations into one of a plurality of predefined object categories and processing each object demarcation based on the object category into which it has been classified, thereby to create the form template automatically.

19 Claims, 6 Drawing Sheets

301 — HANDPRINT

METHOD AND SYSTEM FOR CREATING A FORM TEMPLATE FOR A FORM

This application claims the benefit of priority to U.S. Provisonal Patent 60/972,712 filed Sep. 14, 2007 and which is hereby incorporated by reference.

FIELD

Embodiments of the present invention relate generally to data capture using optical character recognition of forms, and specifically to a method and system for creating a form template for a form.

BACKGROUND

Machine-readable forms (also referred to herein as "forms"), for example, questionnaires, social security forms, invoices, passports, etc. may be used to collect information. Typically, the information in machine-readable forms is structured in named fields, for example "Name", "Social Security Number", "Date", etc. A machine-readable form may be completed by hand, by a dot-matrix printer, by a typewriter or by other means (for an example of a completed machine readable form, refer to FIG. 2).

One of the steps of processing machine-readable forms is the creation of a form template (also referred to herein as a "template"). A template tells a form processing application where to look for particular types of information on the form to ensure reliable recognition of the entered data (a sample form is provided in FIG. 1). A machine-readable form may include static blocks (i.e. elements on the form that are used to facilitate matching form templates with a scanned image of the form) and fields (e.g., text fields, checkmarks, barcodes, etc.) which should be recognized after matching the form template with the form. The static blocks and fields are indicated by various object demarcations. Template elements within a form template may be created manually in a graphics editor, which is a very labor-intensive process. This problem is compounded given that a separate template has to be created for each variant of machine-readable form.

SUMMARY OF INVENTION

In one embodiment, there is disclosed a method of automatically creating a form template for a form. The method comprises analyzing an image of the form to detect object demarcations in the form. The method further comprises classifying the object demarcations into one of a plurality of predefined object categories and processing each object demarcation based on the object category into which it has been classified, thereby to create the form template automatically.

Classifying the object demarcations may comprise comparing the object demarcations against predefined object definitions.

Processing each object demarcation may comprise determining whether or not a particular object demarcation has other object demarcations associated therewith and, if so, grouping together the associated object demarcations.

BRIEF DESCRIPTION OF THE DRAWINGS

While the appended claims set forth the features of the present invention with particularity, the invention, together with its objects and advantages, will be more readily appreciated from the following detailed description, taken in conjunction with the accompanying drawings, wherein:

FIG. 3 shows a schematic view of examples of different types of object demarcations for text input fields used for hand written text.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown only in block diagram form in order to avoid obscuring the invention.

Reference in this specification to "one embodiment" or "an embodiment" means that a particular feature, structure, or characteristic described in connection with the embodiment is included in at least one embodiment of the invention. The appearance of the phrases "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Embodiments of the present invention disclose a method for automatically creating a form template from a scanned image of a machine-readable form Embodiments of the invention also cover a system for implementing said method.

Figure 1:
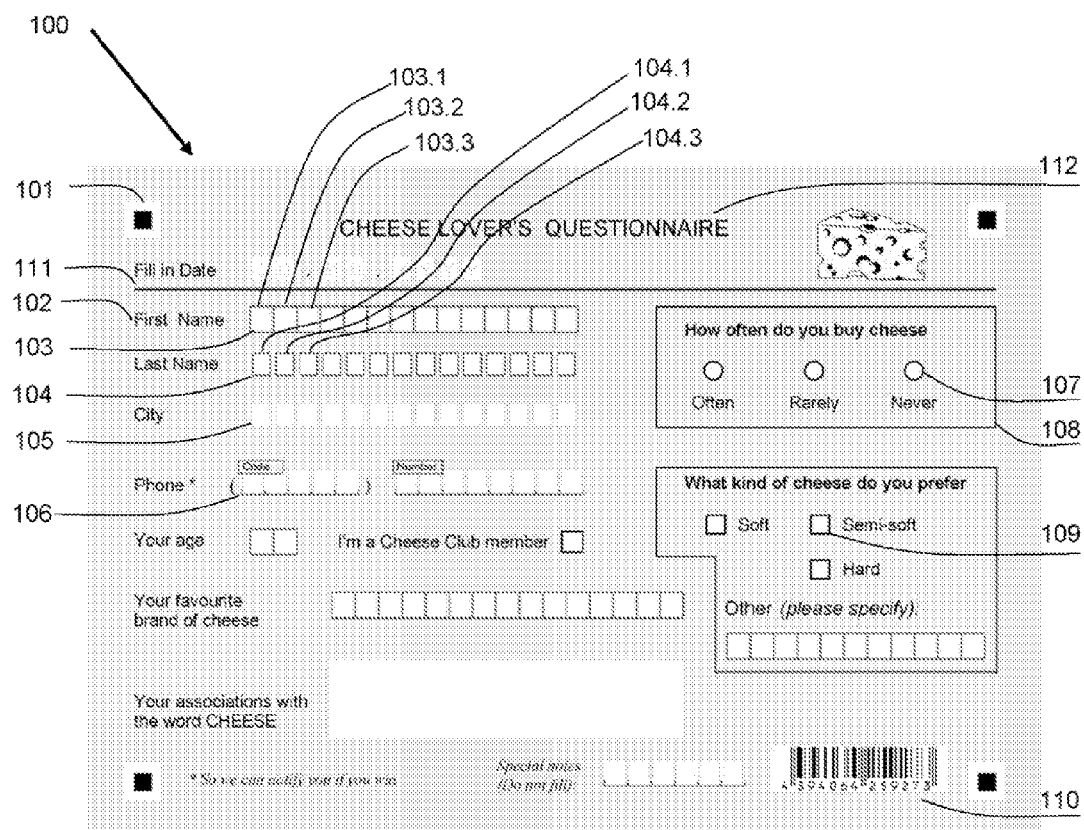
FIG. 1 is a schematic view of an example of a blank or non-completed machine-readable form (in the form of a questionnaire).

Referring to FIG. 1, reference numeral 100 generally indicates a sample of a machine-readable form in the example form of a questionnaire, in accordance with an embodiment. The form 100 includes the following object demarcations:

an anchor (101);

static text, to name or identify an adjacent text, input field (102);

a text input field having an object demarcation in the form of "letters in frame" (103) including a plurality of object demarcations of individual character (or letter) input fields (103.1, 103.2, 103.3);

a text input field having an object demarcation in the form of "letters in separate boxes" (104), including a plurality of object demarcations of individual character (or letter) input fields (104.1, 104.2, 104.3);

a text input field having an object demarcation in the form of "white fields on a gray background" (105);

a text input field having an object demarcation in the form of "letters on a comb" (106);

a round or oval radio button field (107);

a frame for grouping together the radio button fields 107 (108);

a rectangular checkmark field (109);

a barcode (110);

a separator (111); and a static text title (112).

Figure 4:
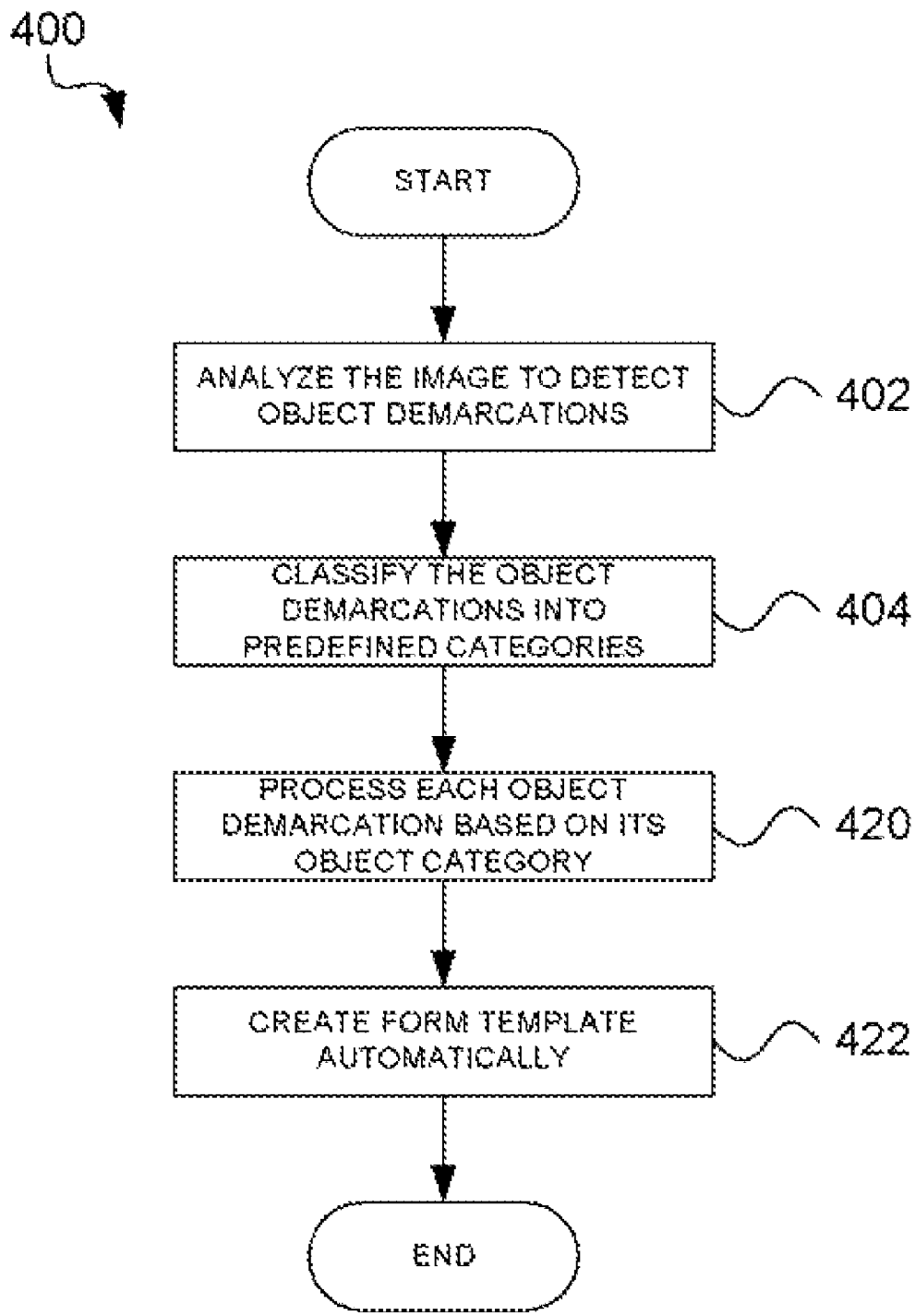
FIG. 4 shows a high-level flowchart of a method for creating a form template for a form, in accordance with one embodiment of the invention.

Referring to FIG. 4 of the drawings, and in accordance with one embodiment, there is provided a method 400 of creating a form template automatically. An image of a form (which, for example, may be the form 100) is analyzed, at block 402, to detect all possible object demarcations contained in the form 100. Arrangements of pixels or dots in the image are detected as particular object demarcations. Based on the particular arrangement of the pixels or dots, the object demarcations are classified, at block 404, into one of a plurality of predefined categories. Further, each object demarcation is then processed, at block 420, based on the category into which it has been classified. Finally, by processing the object demarcations, a form template can be created, at block 422, automatically.

Figure 2:
FIG. 2 is a schematic view of an example of a completed form (in which the form which is shown in FIG. 1 was completed and scanned).
Figure 5:
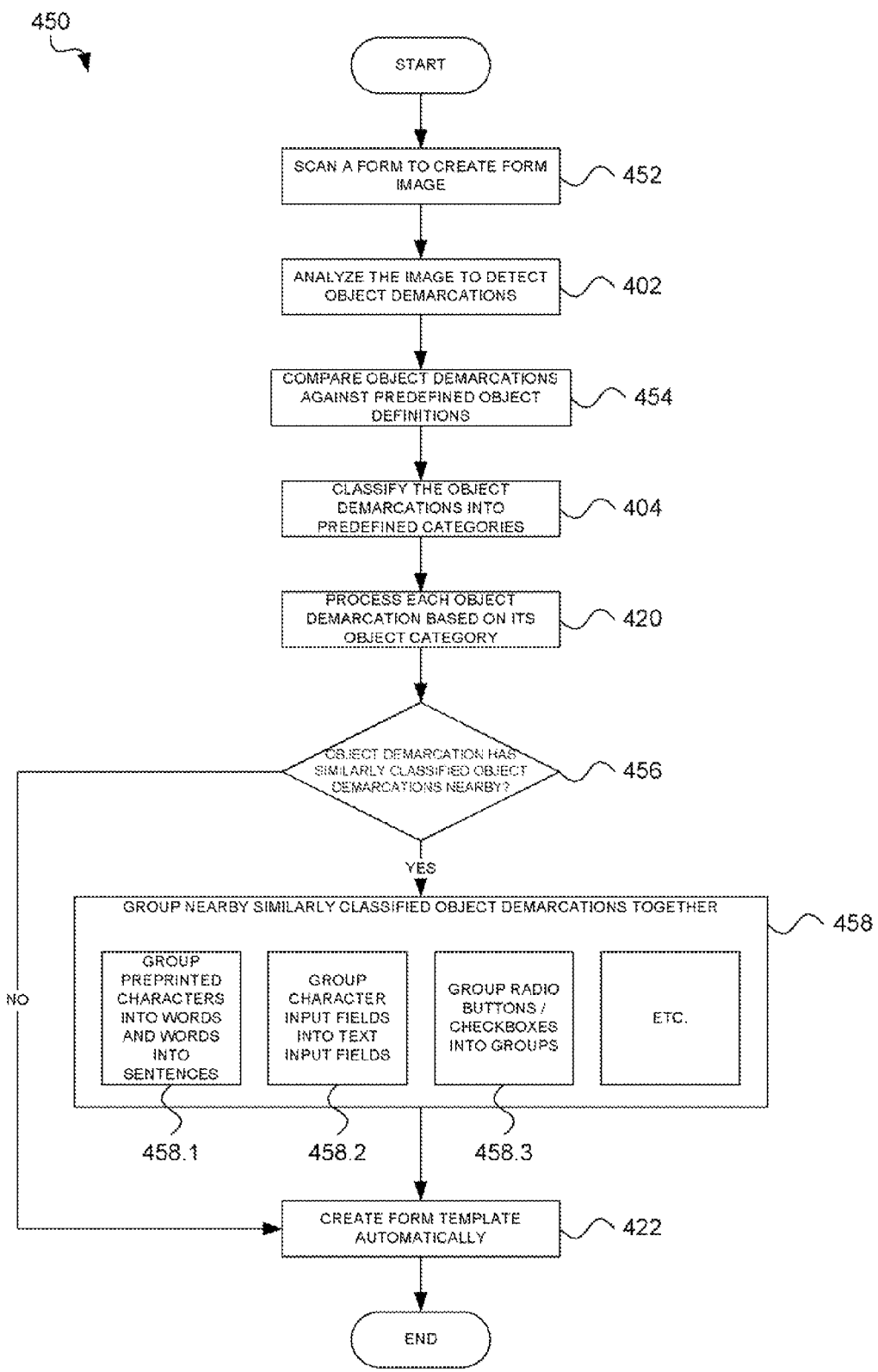
FIG. 5 shows a low-level flowchart of a method for creating a form template for a form, in accordance with one embodiment of the invention.

Referring now to FIG. 5 of the drawings, a method 450 illustrates the embodiment of method 400 (of FIG. 4) in more detail. The method 450 will be described in use with reference to a practical example. A user has a form, for example form 100, for which he does not have a form template. He may wish to supply forms 100 to prospective customers, so that the customers can complete the form (for example, as in form 200 of FIG. 2). The user may then have a data capture system (not illustrated) operable to scan and read the form to capture the information (for example, using optical character recognition) which the customer has filled in. However, the user may not necessarily have a template for the form, and therefore wishes to create a form template. It may be too time-consuming for the user to create the form template manually, and he therefore initiates the method 450 thereby to create the form template automatically.

First, the form 100 is scanned, at block 452, to create a form image. The form image is then analyzed, at block 402, to detect object demarcations. The detected object demarcations are then compared, at block 454, against predefined object definitions. The predefined object definitions may define the object demarcations as preprinted letters, black squares, character input fields in the form of frames and/or comb-like fields, individual dots, etc. The object demarcations are then classified, at block 404, based on the predefined object definitions with which the respective object demarcations have been matched. For example, a black square is defined as an anchor (for example appearing like anchor 101 on the form 100) and may be used as a point of reference for other object demarcations. The method may thus include the prior step of generating or defining the predefined object definitions.

In one embodiment, there may be predefined object definitions for the following types of object demarcations:

Text input fields for hand printed text (for example, 103, 104, 105, 106), comprising a plurality of individual character input fields (103.1, 103.2, 103.3, 104.1, 104.2, 104.3).

Static text (headers, explanatory signatures, etc.) (112).

Checkmark fields for receiving a mark (check, cross, dot, tick, etc.) made by the customer or other person filling out the form (109).

Barcodes, which are a machine-readable form element represented as alternating white and black bars of variable widths, which represent digital information. A barcode in a form may be used to extract information (barcode field) or to match and identify a template (sometimes referred to as an anchor barcode) (110).

Anchors, which are static elements in the shape of a black square, rectangle, cross or corner which is used for template matching (101).

A separator, which is an element of a machine-readable form, typically in the shape of a vertical or horizontal black line, for partitioning the form into several logical segments (111).

Horizontal and vertical table separators.

In one embodiment, if an object demarcation does not correspond to any of the above object definitions, it may be treated as a picture or image.

With reference to FIG. 3, in one embodiment, there may be object definitions for the following types of character input fields:

a series of character input fields enclosed by a frame (301);

a series of slightly spaced apart white character input fields surrounded by a gray background (302);

a series of boxes, each defining a character input field (303);

a comb-like structure, teeth of which define individual character input fields (304);

a comb-like structure within the frame, teeth of the comb-like structure defining individual character input fields (305); and separate dotted boxes within which text may be entered.

Each object demarcation is then processed, at block 420, based on its object category. To this end, it is determined whether or not a particular object demarcation has associated object demarcations. For example, this may involve determining, at block 456, whether or not an object demarcation has another similarly classified object demarcation within a predefined distance thereof, e.g. nearby. In one embodiment, the predefined distances may be selected heuristically, on the basis of real examples. In one embodiment, the predefined distances value may be specified relative to a resolution (in inches). For example, the predefined distance between neighbouring boxes in the same field may be maximum $1/15$ of inch. If the real space between the boxes is greater, then the boxes may belong to different fields.

If so, the similarly classified object demarcations may be grouped, at block 458, together.

For example, one object definition is for preprinted characters, which are then grouped, at block 458.1, with nearby preprinted characters into words and then words grouped into sentences. Further, the words or sentences (collectively referred to as static text) may be associated with a character or text input field, e.g. being the caption of the field or an indication of contents of the field. For example, next to a text input field where a first name must be entered, one will typically find the caption "First Name" (102). For each field, up to 4 locations of static text may be possible: to the left of the field, to the right, above, and below. The method may include evaluating each variant and then selecting the most appropriate static text relative to a field (e.g. the nearest static text). While static text has been allocated to one field, it may be unavailable for allocation to another field.

The method may also include grouping, at block 458.2, adjacent character input fields together into text input fields.

In one embodiment, the method may include grouping, at block 458.3, together checkmark fields within a particular region or area on the image (the checkmark field may be of any shape, e.g. round, oval, square, etc.). A search to determine a particular region or area of the image within which checkmarks may occur may be carried out in several steps. For example, it may be assumed that associated checkmark fields are located in a matrix manner and have the same shapes and sizes. The method may therefore include searching for similar object demarcations that are most common in the given region. If the search fields a plurality of object demarcations in the form of checkmark fields in a particular region, a group of checkmark, fields is created. This feature is particularly useful if there are a large number of checkmark fields, typically arranged in matrix-fashion.

In one embodiment, the input fields (e.g. text input fields, check boxes, etc) may be processed before the static text is processed, thus allowing static text to be associated with previously processed input fields.

The form template is finally created, at block 422, based on the classifications and associations of all of the object demarcations. The form template is then used in conventional fashion. The user may be provided with an opportunity to confirm and/or amend the various object demarcations classifications.

Once the form 100 has been completed and appears as form 200, it may be scanned by means of a data capture system and the characters and other text which the customer has filled into the form 200 may be captured by the data capture system, based on the form template.

Figure 6:
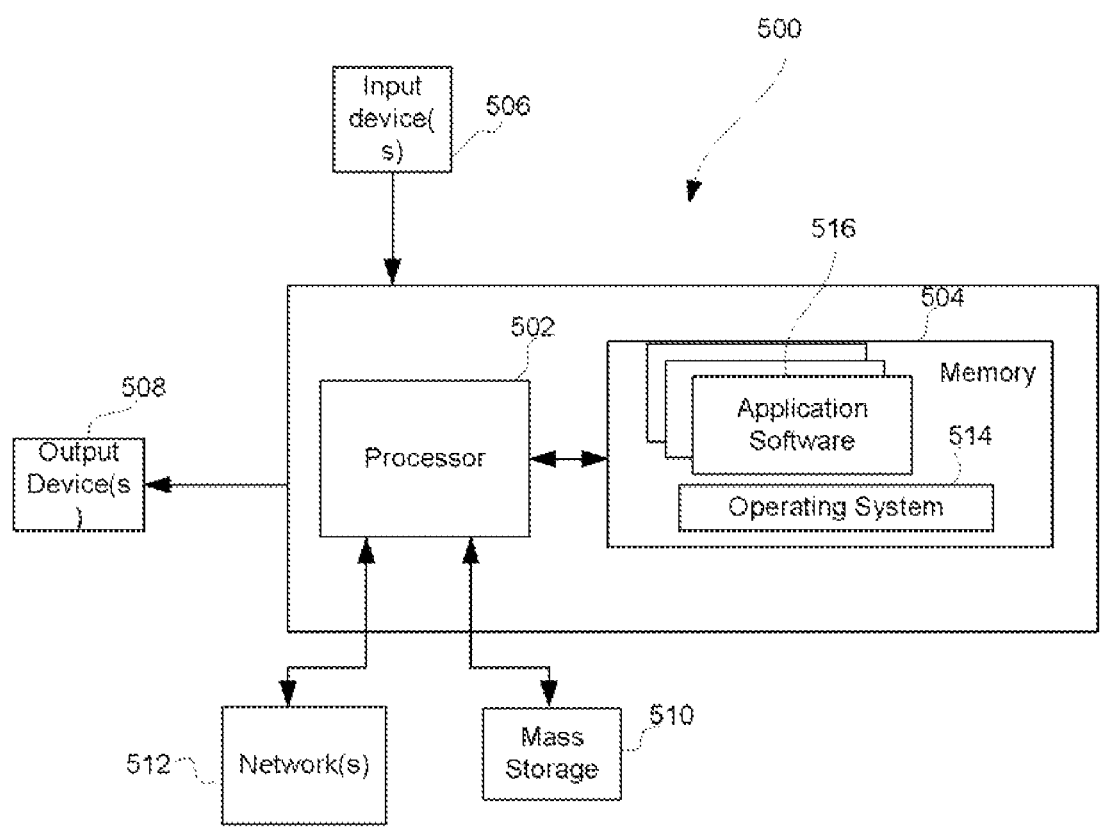
FIG. 6 shows a block diagram of hardware of a system for creating a form template for a form in accordance with one embodiment of the invention.

FIG. 6 of the drawings shows an example of hardware of a system 500 that may be used to implement the methods 400, 450 described above, in accordance with one embodiment of the invention. It is to be appreciated, however, that the methods 400, 450 could be implemented on a different system. The system 500 typically includes at least one processor 502 coupled to a memory 504. The processor 502 may represent one or more processors (e.g., microprocessors), and the memory 504 may represent random access memory (RAM) devices comprising a main storage of the system 500, as well as any supplemental levels of memory e.g., cache memories, non-volatile or back-up memories (e.g. programmable or flash memories), read-only memories, etc. In addition, the memory 504 may be considered to include memory storage physically located elsewhere in the system 500, e.g. any cache memory in the processor 502 as well as any storage capacity used as a virtual memory, e.g., as stored on a mass storage device 510.

The system 500 also typically receives a number of inputs and outputs for communicating information externally. For interface with a user or operator, the system 500 may include one or more user input devices 506 (e.g., a keyboard, a mouse, imaging device, etc.) and one or more output devices 508 (e.g., a liquid Crystal Display (LCD) panel, a sound playback device (speaker).

For additional storage, the system 500 may also include one or more mass storage devices 510, e.g., a floppy or other removable disk drive, a hard disk drive, a Direct Access Storage Device (DASD), an optical drive (e.g. a Compact Disk; (CD) drive, a Digital Versatile Disk (DVD) drive, etc.) and/or a tape drive, among others. Furthermore, the system 500 may include an interface with one or more networks 512 (e.g., a local area network (LAN), a wide area network (WAN), a wireless network, and/or the Internet among others) to permit the communication of information with other computers coupled to the networks. It should be appreciated that the system 500 typically includes suitable analog and/or digital interfaces between the processor 502 and each of the components 504, 506, 508, and 512 as is well known in the art.

The system 500 operates under the control of an operating system 514, and executes various computer software applications, components, programs, objects, modules, etc. to implement the techniques described above. Moreover, various applications, components, programs, objects, etc., collectively indicated by reference 516 in FIG. 6, may also execute on one or more processors in another computer coupled to the system 500 via a network 512, e.g. in a distributed computing environment, whereby the processing required to implement the functions of a computer program may be allocated to multiple computers over a network.

In general, the routines executed to implement the embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc), among others, and transmission type media, such as digital and analog communication links.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

In a particular embodiment, the system 500 may be operable to analyze an image of a form to detect object demarcations in the form. The system 500 may then be operable to classify the object demarcations into one of a plurality of predefined object categories and process each object demarcation based on the object category into which it has been classified, thereby to create the form template automatically.

The invention claimed is:

1. A method of creating a form template for a form without manual identification of object demarcations, the method comprising:
   via computer instructions, detecting object demarcations in an image of the form;
   classifying the object demarcations into one of a plurality of predefined object categories, wherein classifying the object demarcations includes comparing the object demarcations against predefined object definitions;
   processing each object demarcation based on the object category into which it has been classified; and
   creating the form template automatically without user manual identification of object demarcations, wherein the form template includes information usable by form processing instructions to locate particular types of information when processing other form images.

2. The method of claim 1, in which processing each object demarcation comprises determining whether or not a particular object demarcation has other object demarcations associated therewith and, if so, grouping together the associated object demarcations.

3. The method of claim 2, in which determining whether or not a particular object demarcation has other object demarcations associated therewith comprises determining whether or not any similarly classified object demarcations are within a predefined distance thereof and, if so, grouping together the similarly classified object demarcations within the predefined distance.

4. The method of claim 2, in which determining whether or not a particular object demarcation has other object demarcations associated therewith comprises determining whether or not any similarly classified object demarcations are within a particular region on the image and, if so, grouping together the similarly classified object demarcations within the particular region.

5. The method of claim 3, in which: a predefined object category comprises a preprinted character; and grouping together the associated object demarcations comprises grouping preprinted characters into a word.

6. The method of claim 5, wherein the method further comprises grouping words into a sentence.

7. The method of claim 3, wherein a predefined object category comprises a character input field; and wherein grouping together the associated object demarcations comprises grouping character input fields into a text input field.

8. The method of claim 4, in which: a predefined object category comprises a checkmark field; and grouping together the associated object demarcations comprises grouping together checkmark fields in the particular region.

9. A system for automatically creating a form template for a form, the system comprising;
   a processor;
   a memory in electronic communication with the processor, the memory configured with application instructions operable to perform acts comprising:
      detecting object demarcations in an image of a form without manual identification of said object demarcations;
      comparing the said object demarcations against predefined object definitions;
      classifying an object demarcation into a predefined object category; and
      processing the said classified object demarcation based on the predefined object category into which the said classified object demarcation has been classified; and
      automatically creating in said memory the form template based on said processing, wherein the form template includes information usable by form processing computer instructions to locate particular types of information when processing other form images.

10. The system of claim 9, which is operable to determine whether or not a particular object demarcation has other object demarcations associated therewith and, if so, to group together the associated object demarcations, thereby to process each object demarcation.

11. The system of claim 10, which is operable to determine whether or not any similarly classified object demarcations are within a predefined distance thereof and, if so, to group together the similarly classified object demarcations within the predefined distance, thereby to determine whether or not a particular object demarcation has other object demarcations associated therewith.

12. The system of claim 10, which is operable to determine whether or not any similarly classified object demarcations are within a particular region on the image and, if so, to group together the similarly classified object demarcations within the particular region, thereby to determine whether or not a particular object demarcation has other object demarcations associated therewith.

13. The system of claim 11, in which a predefined object category comprises a preprinted character and which is operable to group preprinted characters into a word, thereby to group together the associated object demarcations.

14. The system of claim 13, which is operable to group words into a sentence.

15. The system of claim 11, in which a predefined object category comprises a character input field and which is operable to group character input fields into a text input field, thereby to group together the associated object demarcations.

16. The system of claim 12, in which a predefined object category comprises a checkmark field and which is operable to group together checkmark fields in the particular region, thereby to group together the associated object demarcations.

17. A non-transitory machine-readable medium embodying a set of instructions which, when executed by a machine, causes the machine to perform steps to automatically create a form template, the steps including:
   analyzing an image of a form to detect object demarcations on the form;
   classifying an object demarcation into one or more predefined object categories;
   comparing the said classified object demarcation against predefined object definitions;
   processing each object demarcation based on the object category into which said object demarcation has been classified, thereby to create the form template automatically; and
   automatically creating in a computer memory the form template based on said processing, wherein the form template includes information usable by form processing computer instructions to locate particular types of information when processing other form images.

18. The method of claim 1, wherein the method further comprises:
   processing input fields before processing static text thereby allowing static text to be associated with one or more previously processed input fields.

19. The method of claim 1, wherein the method further comprises:
   searching for object demarcations that are similar to another object demarcation in a region of the image of the form.

* * * * *